United States Patent
Zuo et al.

(10) Patent No.: US 9,623,660 B2
(45) Date of Patent: *Apr. 18, 2017

(54) B-STAGE FILM ADHESIVE COMPATIBLE WITH AQUEOUS INK FOR PRINTHEAD STRUCTURES INTERSTITIAL BONDING IN HIGH DENSITY PIEZO PRINTHEADS FABRICATION FOR AQUEOUS INKJET

(71) Applicant: Xerox Corporation, Norwalk, CT (US)

(72) Inventors: Yanjia Zuo, Rochester, NY (US); Mandakini Kanungo, Penfield, NY (US); Hong Zhao, Webster, NY (US); Pratima Gattu Naga Rao, Sherwood, OR (US); Mark A. Cellura, Webster, NY (US); Santokh S. Badesha, Pittsford, NY (US); John R. Andrews, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/265,119

(22) Filed: Apr. 29, 2014

(65) Prior Publication Data
US 2014/0342160 A1   Nov. 20, 2014

Related U.S. Application Data

(63) Continuation-in-part of application No. 13/893,523, filed on May 14, 2013, now Pat. No. 9,050,807.

(51) Int. Cl.
*B29C 65/02* (2006.01)
*B29C 65/48* (2006.01)
(Continued)

(52) U.S. Cl.
CPC ............ *B41J 2/1607* (2013.01); *B29C 65/02* (2013.01); *B29C 65/48* (2013.01); *B32B 7/12* (2013.01);
(Continued)

(58) Field of Classification Search
CPC ........ B29C 65/02; B29C 65/48; B41J 2/1623; B41J 2/14024; B41J 2202/07; B41J 2202/19
(Continued)

(56) References Cited

U.S. PATENT DOCUMENTS

| 4,506,371 A * | 3/1985 | Cross ................. G01K 1/04 156/245 |
| 5,764,263 A * | 6/1998 | Lin ................. B41J 11/0015 347/101 |
| 6,266,872 B1 * | 7/2001 | Fjelstad ............ H01L 21/4846 257/E23.065 |

FOREIGN PATENT DOCUMENTS

JP          09123466 A  *  5/1997

OTHER PUBLICATIONS

P. Canale, TechFilm I2300 Material Safety Data Sheet, Aug. 4, 2008, pp. 1-3.
(Continued)

*Primary Examiner* — Scott W Dodds
(74) *Attorney, Agent, or Firm* — MH2 Technology Law Group LLP

(57) ABSTRACT

A method for forming an ink jet printhead comprises processing an epoxy adhesive such that negative effects from physical contact with particular inks are reduced or eliminated. Conventional adhesives processed using conventional techniques are known to gain weight and squeeze out when exposed to certain inks such as ultraviolet inks, solid inks, and aqueous inks. An embodiment of the present teachings can include processing of a particular adhesive such that the resulting epoxy adhesive is suitable for printhead applications.

5 Claims, 7 Drawing Sheets

(51) Int. Cl.
    B41J 2/16      (2006.01)
    B32B 7/12      (2006.01)
    B41J 2/14      (2006.01)
    B32B 15/04     (2006.01)
    B32B 15/08     (2006.01)
    B32B 27/08     (2006.01)
    B32B 27/28     (2006.01)

(52) U.S. Cl.
    CPC ............ *B32B 15/043* (2013.01); *B32B 15/08* (2013.01); *B32B 27/08* (2013.01); *B32B 27/281* (2013.01); *B41J 2/14201* (2013.01); *B41J 2/14233* (2013.01); *B41J 2/161* (2013.01); *B41J 2/1623* (2013.01); *B32B 2307/75* (2013.01); *B41J 2002/14403* (2013.01); *B41J 2002/14491* (2013.01); *Y10T 428/31515* (2015.04)

(58) Field of Classification Search
    USPC ............................ 156/307.1, 307.3, 306.6
    See application file for complete search history.

(56) References Cited

OTHER PUBLICATIONS

Gerner et al., "Patterned Heater Traces for Inkjet Printhead", U.S. Appl. No. 13/443,269, filed Apr. 10, 2012.

Yanjia Zuo et al., "Processing and Application of Liquid Epoxy Adhesive for Printhead Structures Interstitial Bonding in High Density Piezo Printheads Fabrication", U.S. Appl. No. 13/854,583, filed Apr. 1, 2013.

Kanungo et al., "Process for Bonding Interstitial Epoxy Adhesive for Fabrication of Printhead Structures in High Density Printheads", U.S. Appl. No. 13/893,523, filed May 14, 2013.

* cited by examiner

B-STAGE FILM ADHESIVE COMPATIBLE WITH AQUEOUS INK FOR PRINTHEAD STRUCTURES INTERSTITIAL BONDING IN HIGH DENSITY PIEZO PRINTHEADS FABRICATION FOR AQUEOUS INKJET

PRIORITY

This application is a continuation-in-part of application Ser. No. 13/893,523, filed May 14, 2013, the disclosure of which is incorporated herein by reference in its entirety.

TECHNICAL FIELD

The present teachings relate to the field of ink jet printing devices and, more particularly, to methods and structures for high density piezoelectric ink jet print heads and a printer including a high density piezoelectric ink jet print head.

BACKGROUND

Drop on demand ink jet technology is widely used in the printing industry. Printers using drop on demand ink jet technology can use either thermal ink jet technology or piezoelectric technology. Even though they are more expensive to manufacture than thermal ink jets, piezoelectric ink jets are generally favored, for example because they can use a wider variety of inks.

Piezoelectric ink jet print heads include an array of piezoelectric elements (i.e., piezoelectric transducers or PZTs). One process to form the array can include detachably bonding a blanket piezoelectric layer to a transfer carrier with an adhesive, and dicing the blanket piezoelectric layer to form a plurality of individual piezoelectric elements. A plurality of dicing saw passes can be used to remove all the piezoelectric material between adjacent piezoelectric elements to provide the correct spacing between each piezoelectric element.

Piezoelectric ink jet print heads can typically further include a flexible diaphragm to which the array of piezoelectric elements is attached. When a voltage is applied to a piezoelectric element, typically through electrical connection with an electrode electrically coupled to a power source, the piezoelectric element bends or deflects, causing the diaphragm to flex which expels a quantity of ink from a chamber through a nozzle. The flexing further draws ink into the chamber from a main ink reservoir through an opening to replace the expelled ink.

The formation of ink jet printheads typically requires lamination of multiple layers of materials as part of their fabrication. Traditional printhead designs may use layers of gold-plated stainless steel sheet metal with features that are photochemically etched and then brazed together to form robust structures. However, with the continued drive to improve cost and performance, use of alternate materials and bonding processes may be used. While polymer layers can be used as a replacement of some sheet metal components, polymers require adhesives with suitable properties to bond to each other and to metal layers.

For example, the adhesive must be chemically compatible with the inks used within the printhead. Further, the adhesive should have certain physical properties that reduce printhead failures during use. An adhesive should have a good bond strength, a low squeeze out to prevent blocking of the fluid path, and should be sufficiently resistant to oxidation with elevated temperatures during use. Also, some adhesives may increase in weight and swell, or become less compliant and more stiff during use when exposed to certain inks and elevated temperatures, which can result in leakage of ink or other failure modes. Some of these failures may occur only after extended use of the printhead.

Additionally, incompatibility with aqueous inks may swell the adhesive, thereby causing changes in dimensional geometry that will affect jetting performance. For the requirements of printhead modularity design, an adhesive with a lower bonding temperature is needed. Some current adhesives have a bonding temperature of 290° C. or higher, which is above the critical temperatures for some components in the jet stack, for example the PZTs. Therefore a new adhesive is desired to accommodate bonding of all components in an ink jet printhead configured for use with an aqueous ink.

SUMMARY

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment, a method for forming an ink jet printhead can include heating a first surface of a first substrate to a temperature of between 40° C. and 120° C., contacting the heated first surface of the first substrate with a first surface of an epoxy adhesive to tack the epoxy adhesive to the first surface of the first substrate, moving a roller across either a release liner on a second surface of the epoxy adhesive or a second surface of the first substrate to remove air bubbles at an interface between the first surface of the epoxy adhesive and the first surface of the first substrate, and cooling the first substrate and the epoxy adhesive to a temperature of 22° C. or less. Subsequently, the method can further include heating a first surface of a second substrate to a temperature of between 40° C. and 120° C. and, with the epoxy adhesive tacked to the first surface of the first substrate, contacting the heated first surface of the second substrate with a second surface of the epoxy adhesive to tack the epoxy adhesive to the first surface of the second substrate. The method can further include moving a roller across a second surface of the second substrate to remove air bubbles at an interface between the second surface of the epoxy adhesive and the first surface of the second substrate then, after tacking the epoxy adhesive to the first substrate and the second substrate, partially curing the epoxy adhesive by heating the first substrate, the second substrate, and the epoxy adhesive to a temperature of between about 80° C. and about 140° C. for a duration of between about 10 minutes and about 20 minutes. After partially curing the epoxy adhesive, the epoxy adhesive is fully cured by heating the first substrate, the second substrate, and the epoxy adhesive within a press to a temperature of between 100° C. and 300° C. for a duration of between 20 minutes and 200 minutes and at a pressure of between 40 psi and 100 psi. The printhead is filled with an aqueous ink and the fully cured epoxy is exposed to the aqueous ink.

In another embodiment, an ink jet printhead can include a first substrate, a second substrate, an epoxy adhesive interposed between the first substrate and the second substrate that physically connects the first substrate to the second substrate. The epoxy adhesive can include a cresol novolac and bisphenol A epoxy resin and can have a lap shear strength greater than 200 psi bonding the first substrate to the second substrate. The ink jet printhead can further include an aqueous ink within the ink jet printhead that physically contacts the epoxy adhesive, and the epoxy adhesive has a mass uptake of less than 0.4% when exposed continuously to the aqueous ink for 20 weeks.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc. Unless otherwise specified, the word "polymer" encompasses any one of a broad range of carbon-based compounds formed from long-chain molecules including thermoset polyimides, thermoplastics, resins, polycarbonates, epoxies, and related compounds known to the art.

Achieving reliable adhesion between many different ink jet printhead layers and materials, particularly at the harsh environmental conditions found in current ink jet printhead uses, is a concern for device manufacturers. An embodiment of the present teachings can result in a more robust physical adhesive connection between the various laminated layers within a printhead, particularly with regard to resistance to chemically harsh inks such as acrylate-based ultraviolet (UV) inks, pigmented solid inks, and aqueous inks, and may result in decreased stresses on the interconnection which electrically couples a piezoelectric transducer (PZT) to a circuit layer such as a printed circuit board or flexible printed circuit.

Figure 1:
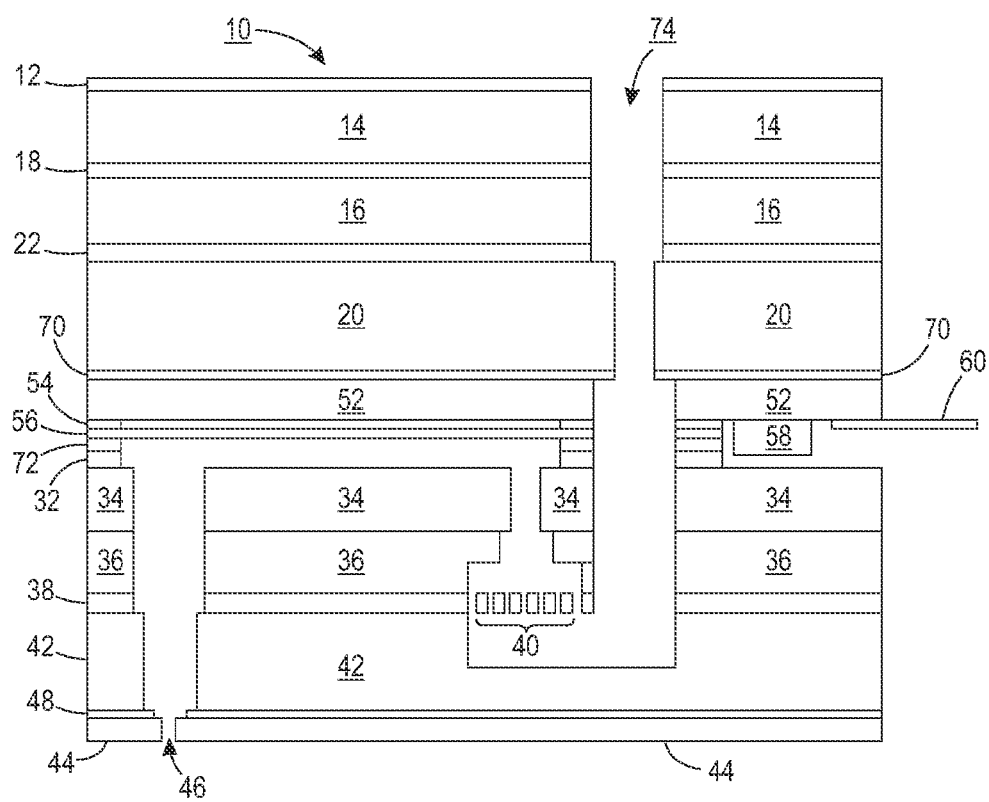
FIG. 1 is a cross section of an exemplary ink jet printhead portion formed in accordance with an embodiment of the present teachings.

Printhead structures are known in the art and include many layers laminated together. The adhesives used for lamination must resist reaction with chemically harsh inks, bond well to surfaces of different materials to prevent rupture during high-pressure printing, and hold up during high temperature printing, for example during printing with solid inks and aqueous inks. FIG. 1 depicts a portion of an exemplary ink jet printhead structure 10 that may be formed using an embodiment of the present teachings. The FIG. 1 printhead structure 10 includes a compliant wall 12, an external manifold 14, and a diverter 16 attached to the external manifold 14 with an external manifold adhesive 18. FIG. 1 further depicts a boss plate 20 attached to the diverter 16 with a diverter attach adhesive 22. In an embodiment, the compliant wall 12 can include thermoplastic polyimide, the external manifold 14 can include aluminum, and the boss plate 20 can include stainless steel. The external manifold 14 can receive liquid ink (not individually depicted for simplicity) during use which has been melted from solid ink blocks, a UV and Xerox gel UV ink, an aqueous (i.e., water-based) ink such as a latex aqueous ink and a dye-based aqueous ink, pigment-based aqueous ink, or another liquid ink in preparation for printing, and maintain the ink at a print temperature. FIG. 1 further depicts a body 32, a vertical inlet 34, a separator 36, a particulate filter (rock screen) layer 38 including a rock screen 40, a front end manifold 42, and an aperture plate 44 having a nozzle 46. The aperture plate 44 can be attached to the front end manifold 42 with an aperture plate adhesive 48. In an embodiment, the body 32, the separator 36, and the front end manifold 42 can include a metal such as stainless steel, and the vertical inlet 34, the rock screen layer 38, the aperture plate adhesive 48, and the aperture plate 44 can each include one or more polymers. The assembly 10 can be manufactured according to known processing techniques, such as a process including the use of a stack press under high pressure. FIG. 1 further depicts a substrate 52 such as a semiconductor wafer section, glass layer, metal layer, etc., a standoff layer 54, a printhead diaphragm (membrane) 56, a boss plate adhesive 70, a diaphragm adhesive 72, an application specific integrated circuit (ASIC) 58 attached to the semiconductor wafer section, and an interconnect layer 60 such as a flexible (flex) circuit or printed circuit board electrically coupled to the ASIC 58. As discussed above, the substrate 52 can be a silicon, gallium arsenide, metal, glass, etc. Further, the standoff layer 54 can be silicon dioxide and/or SU-8 photoresist. The diaphragm 56 can be a metal such as titanium, nickel, or a metal alloy. The substrate 52 may include a circuit pattern. It will be appreciated that the depiction of the FIG. 1 is a small portion of a printhead depicting a single ink port 74 and nozzle 46, and that other structures may be added or existing structures may be removed or modified. A printhead with current designs may have four ink inlets, one for each color (cyan, magenta, yellow, and black in a CMYK color model, for example), and 7040 nozzles. The structure of FIG. 1 may be formed using an embodiment of the present teachings and may include a structure in accordance with an embodiment the present teachings.

A desirable adhesive for printhead applications would be able to bond any combination of metal layers (e.g., stainless steel, aluminum, etc.) and/or polyimide layers. In selecting an adhesive, similar formulations may have differing properties and operating characteristics. Extensive in-house testing is required to characterize the properties of an adhesive to determine whether it has the necessary characteristics for a specific use. While a supplier may publish some operating characteristics, other unknown characteristics may be of particular interest to a manufacturer searching for a suitable adhesive and thus characterization of the adhesive by the manufacturer is necessary. A large number of adhesive formulations are commercially available and identifying an adhesive that has the necessary characteristics often presents a formidable challenge. Further complicating the selection is the fact that an adhesive may embody different characteristics at different thicknesses, different application processes, and at different temperatures. Additionally, an adhesive may react differently when exposed to different chemicals having similar formulations, for example to similar but different ink formulations. The variety of combinations of epoxy resins and curing agents provides wide latitude in chemical and mechanical properties at the final cured stage.

An embodiment of the present teachings can include the use of an adhesive for physically attaching together two or more printhead parts. In use, the adhesive may be subjected to harsh chemical inks, such as pigmented solid inks, UV gel inks, and aqueous inks, and to high temperatures and pressures associated with printing, for example, solid inks. In an embodiment, the adhesive may be an epoxy-based liquid adhesive that is a thermosetting polymer, and may be a TechFilm TF0063-86 (i.e., TF0063-86) available from Resin Designs, LLC of Woburn, Mass. In an embodiment, the adhesive, when properly processed in accordance with an embodiment of the present teachings, may enable the fabrication of a high performance, low cost, high density ink jet printhead. The adhesive is chemically resistant to hostile inks used in current printing applications and maintains adhesion in high-temperature, high-pressure printing conditions.

The adhesive identified above, TF0063-86, is a B-stage, two part epoxy. As with many epoxies, TF0063-86 includes an epoxy resin and an epoxy curing agent (i.e., hardener) which are mixed together to provide the final adhesive. More specifically, the TF0063-86 epoxy film adhesive is a blend of base components including two bisphenol A epoxy resins, cresol novolac resin, an imidazole amine hardener, and a latent curing agent, dicyandiamide (i.e., "DICY"). The blend of the BisPhenol A Epoxy Resins (DGEBA resins) and the Cresol Novolac Resin coupled with the hardener and latent curing agent give adequate thermo-oxidation resistance, good workability, long pot life, and higher heat resistance than some other adhesives. Additionally, the relatively small amount of the DICY latent curing agent present, e.g., about 2% to 3% by weight, reduces the number of amine linkages in the cured material which are otherwise susceptible to oxidative attack. The combination of resins and curing agent chemistries and ratios provide an extended pot life at room temperature. Solvents, for example 2-butoxy ethyl acetate, may be used to dilute the uncured epoxy blend such that the material may be coated onto a liner for use as a film. In addition, a minimum amount of this solvent may remain for improved ease of handling of the adhesive films. Laser ablation work has shown that this film may be accurately cut into specific geometries.

A chemical structure of the cresol novolac resin may be:

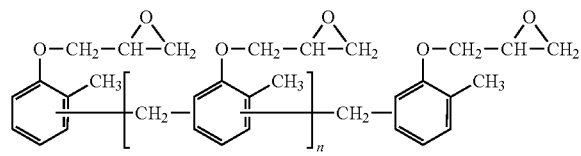

Another chemical structure of the cresol novolac resin may be:

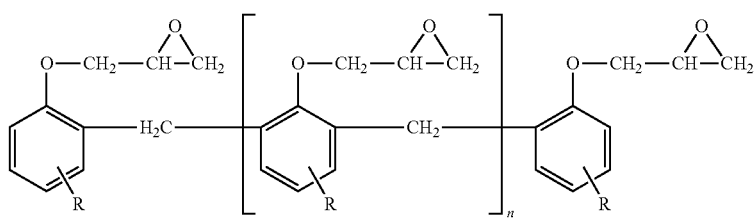

The curing agent used may be DICY, which has the form:

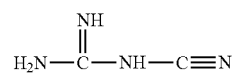

DICY is a representative latent during agent that forms crystals when processed in accordance with the present teachings. It may be used in the form of a fine powder dispersed within the resin. The material has a very long pot life, for example 6 to 12 months. DICY cures at a high temperature, for example from about 160° C. to about 180° C. in about 20 minutes to about 60 minutes. Cured DICY resins have a good adhesiveness and are less prone to staining that some other resins. DICY may be used in one-part adhesives, powder paints, and pre-impregnated composite fibers (i.e., "pre-pregs").

Another co-curing agent that may be used in the epoxy adhesive is imidazole. Imidazoles are characterized by a relatively long pot life, the ability to form cured resin with a high heat deformation temperature by thermally treating at a medium temperature (80° C. to 120° C.) for a relatively short duration, and the availability of various derivatives having moderate reactivity that improves workability. When used as a co-curing agent with DICY, imidazole may exhibit a better pot life, a faster curing speed, and a higher heat resistance of the cured substance than when an adhesive is used with some other co-curing agents.

Some representative chemical structures of various imidazoles, one or more of which may be included as a co-curing agent, include 1-methylimidazole:

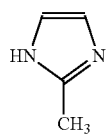

2-ethyl, 4-methyl imidazole:

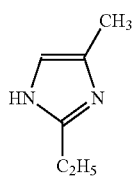

and 1-cyanoethyl-2-undecylimidazolium trimellitate:

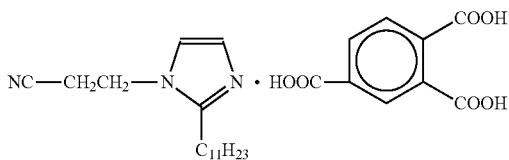

The TF0063-86 may be supplied as a solid adhesive interposed between a first release liner and a second release liner, where the adhesive is used to attach a first substrate to a second substrate. In an embodiment of the present teachings, the release liner is removed to expose a first adhesive surface, the first adhesive surface is contacted to a surface of the first substrate, the second release liner is removed to expose a second adhesive surface, and the second adhesive surface is contacted to a surface of the second substrate. The embodiments described below are with reference to a solid adhesive interposed between a first release liner and a second release liner, although other embodiments are contemplated.

In an embodiment of the present teachings, the adhesive may be used to adhere or bond two surfaces together using a particular process to apply the adhesive. The process may result in the adhesive having various desirable operating characteristics or properties for a printhead fabrication application that are not found if a different application process is used. A novel fabrication process has been developed to enable the use of TF0063-86 epoxy adhesive for printhead interstitial bonding with little or no squeeze out at high pressure and good bonding strength with little or no formation of trapped air bubbles.

The procedure for attaching two or more surfaces together using the TF0063-86 adhesive may include an embodiment of the following process. While the process is described with reference to the attachment of a polyimide film as a first substrate and a stainless steel sheet as a second substrate using the TF0063-86 film for simplicity of description, it will be understood that the TF0063-86 epoxy adhesive may be used to attach other substrates together, for example various metals, polyimide layers, polymers other than polyimide, and combinations thereof.

In an embodiment, the substrate surfaces that are to be bonded are prepared using a surface preparation process. The composition of the substrate material will depend on the application and may include metals such as stainless steel or aluminum, or polymers such as polyimide other others. The surface preparation can include cleaning the first and second substrates using a solvent such as isopropyl alcohol (isopropanol, IPA) to remove trace contaminating substances such as oils and airborne particulates.

After cleaning the bonding surfaces with a solvent, the surface preparation may also include subjecting the bonding surfaces to a plasma cleaning process. In an embodiment, the plasma cleaning process may include an oxygen plasma cleaning process for a duration of from about 2 minutes to about 10 minutes. The plasma cleaning process is used to further remove any contaminants from the bonding surfaces and also to roughen the substrate to increase the bonding surface area for improved adhesion.

After surface preparation, the adhesive and first substrate are prepared for tacking with the adhesive. In an embodiment, the first release liner is removed from the first surface of the solid adhesive. At least the bonding surface of the first substrate is heated to a tacking temperature of between about 40° C. and about 120° C., or between about 50° C. and about 100° C., or between about 50° C. and about 60° C. This heating may be performed, for example, by heating the first substrate on a hot plate or within an oven. The entire first substrate may be heated, or only the bonding surface may be heated. After heating the bonding surface of the first substrate, the first surface of the solid adhesive is contacted with the bonding surface of the first substrate, for example by placing the first surface of the adhesive onto the bonding surface to tack the first substrate to the adhesive.

At the tacking temperature, the first substrate-adhesive assembly is rolled by moving a roller under pressure across either the exposed second release liner on the second surface of the adhesive, across a second surface (back side) of the first substrate, or both. This rolling stage assists in removing air bubbles at the interface between the first surface of the adhesive and the bonding surface of the first substrate. In an embodiment, the roller may be rolled across the first substrate-adhesive assembly at a pressure, for example at a roller pressure of between about 1 psi and about 10 psi, or between about 1 psi and about 5 psi, against the surface.

After this processing stage, the first substrate-adhesive assembly is cooled to ambient temperature of 22° C. or less to result in the first substrate being tacked to the adhesive. This tack procedure serves to wet the adhesive onto the substrate to reduce or eliminate air bubbles.

Subsequently, the second release liner is removed from the second surface of the solid adhesive. At least the bonding surface of the second substrate is heated to the tacking temperature as described above for the first substrate, between about 40° C. and about 120° C., or between about 50° C. and about 100° C., or between about 50° C. and about 60° C. for a duration of between about 1 minute and about 5 minutes. This heating may be performed, for example, by heating the second substrate on a hot plate or within an oven. The entire second substrate may be heated, or only the bonding surface may be heated. After heating the bonding surface of the second substrate, the second surface of the solid adhesive is contacted with the bonding surface of the second substrate, for example by placing the second surface of the adhesive onto the bonding surface to tack the second substrate to the adhesive.

At the tacking temperature, the second substrate-adhesive assembly is rolled by moving a roller under pressure across the back of the second substrate to assist in the removal of bubbles at the interface between the second surface of the adhesive and the bonding surface of the second substrate. In an embodiment, the roller may be rolled across the second substrate-adhesive assembly at a pressure, for example at a roller pressure of between about 1 psi and about 10 psi, or between about 1 psi and about 5 psi, against the surface. After rolling the second substrate-adhesive assembly, first and second substrates are partially adhered together using the tacky TF0063-86 adhesive. The three layer assembly, including the first and second substrates and the TF0063-86 adhesive, may be cooled to ambient temperature, or may proceed directly to the next processing stage without cooling, for example by ramping the temperature to the partial curing temperature as described below. While the process is described with reference to a three layer assembly, the three layer assembly may include additional substrates attached to the three layer assembly, for example using other TF0063-86 adhesive layers or other portions of the existing TF0063-86 adhesive.

After rolling the second substrate-adhesive assembly to form the three layer assembly, an adhesive partial curing process is performed. The three layer assembly may be heated to a partial curing temperature of between about 80° C. and about 140° C., or between about 90° C. and about 120° C., or between about 100° C. and about 120° C., for example about 120° C. The three layer assembly may be heated, for example, on a hot plate or in an oven. Once the three layer assembly reaches the partial curing temperature, heat is applied to the three layer assembly for a duration of between about 10 minutes and about 20 minutes, for example about 15 minutes. This partial curing process is a crucial stage to decrease, minimize, or eliminate squeeze out of the adhesive during subsequent processing. If a temperature and/or duration of this partial curing stage is insufficient or excessive, adhesive squeeze out, over-curing of the adhesive, or damage to the adhesive components may occur.

After the partial curing process, the three layer assembly is heated under pressure, for example in a jet stack press, to a final bonding temperature to complete the bonding process to form a fully cured adhesive. In an embodiment, the assembly is heated to a final bonding temperature of between about 100° C. and about 300° C., or between about 150° C. and about 200° C., or between about 180° C. and about 200° C., for example about 190° C. Once the three layer assembly reaches the final bonding temperature, heat is applied to the three layer assembly for a duration of between about 20 minutes and about 200 minutes, or between about 60 minutes and about 100 minutes, for example about 70 minutes. During the application of the final bonding temperature, a bonding pressure of between about 40 psi and about 100 psi, or at a pressure of 70 psi or less, or at a maximum pressure of 70 psi, for example a pressure of about 55 psi, is applied to the three layer assembly within the jet stack press. After curing the adhesive at the final bonding temperature under the bonding pressure for the above-stated duration, the pressure and temperature are decreased to ambient levels to complete the bonding process. For purposes of this disclosure, a "fully cured" adhesive refers to an adhesive that is sufficiently cured for use of the printhead (e.g., more than 95% cured). A curing agent such as DICY and/or a co-curing agent such as imidazole may or may not remain in the fully cured adhesive depending, for example, on whether the fully cured adhesive is 100% cured. In an embodiment, depending on a ratio of epoxy to curing agent in the pre-cured formulation, the curing agent such as DICY may remain in the matrix after curing even if the adhesive is 100% cured.

In an embodiment, TF0063-86 epoxy adhesive may be used, referring to FIG. 1, as the external manifold adhesive 18, the diverter attach adhesive 22, the aperture plate adhesive 48, the boss plate adhesive 70, the diaphragm adhesive 72, or generally any printhead adhesive. The epoxy adhesive may be used to physically attach any combination of one or more metals (e.g., stainless steel, aluminum, copper, metal alloy, etc.), one or more semiconductors (e.g., silicon, gallium arsenide, etc.), and/or one or more organic or inorganic polymers (e.g., polyimide, nylon, silicone, etc.).

During testing, it was found that a cured epoxy adhesive prepared according one or more of the process embodiments described above demonstrated characteristics and properties well suited for printhead applications. In one test, nozzles were drilled into an adhesive sample including the TF0063-86 adhesive prepared according to an embodiment described above and evaluated for bubbles. No bubbles greater than 20 µm were detected using this process.

Wicking or squeeze out of adhesive occurs when the cured adhesive has a change in dimension of 5% or greater, which can lead to leakage of ink or bursting of the printhead during high-pressure printing. For example, pressures within a solid ink jet printhead can reach up to 10 psi. The subject material demonstrated a squeeze out of less than 5%. A squeeze out test was performed on an assembly including TF0063-86 adhesive interposed between a stainless steel layer and a polyimide layer with 500 µm nozzles processed according to an embodiment described above. The completed adhesive had a thickness of about 1 mil. All of the nozzles were open subsequent to final bonding in a jet stack press. A different printhead adhesive prepared using the same process failed to perform satisfactorily with complete blockage of the nozzles. Additionally, the same adhesive without the partial curing stage failed.

To provide sufficient bonding of metal to metal, metal to polyimide, or polyimide to polyimide, an adhesive must provide a lap shear strength, regardless of the material, of greater than about 200 psi. Some adhesives minimally meet this tolerance, do not meet this tolerance, or meet the tolerance only at room temperatures. In a lap shear sample preparation, the stainless steel adherends were cleaned for five minutes in an ultrasonic bath of IPA, then another four minutes of detergent ultrasonic cleaning, followed by a five minutes of a rinse in deionized water, followed by oven drying at 100° C. for 30 minutes, then a plasma clean. The TF0063-86 adhesive was bonded between the adherends as described above at a thickness of 1.0 mil. For an area of 0.62 in$^2$, a maximum load was found to be 1627.2 pound-force (lbf), and the lap shear strength was found to be greater than 2600 psi (2625 psi) bonding a first substrate to a second substrate. The material prepared according to the method described above thus demonstrated good bonding strength for printhead applications.

Additionally, weight gain (i.e., mass uptake) of an adhesive during exposure to harsh inks results in swelling, which can cause leakage or bursting of the printhead during high-temperature, high-pressure use. In an embodiment of the present teachings, when exposed to gel UV ink, the cured epoxy adhesive resisted weight gain and swelling (i.e., less than 0.4% weight gain) when exposed to harsh inks at 90° C. continuously for 20 weeks and is thus compatible with harsh inks. In contrast, some conventional inks used in printhead fabrication show marked weight change when exposed to harsh inks, in some cases a percent change in weight of as much as 160% after less than 1000 hours of testing.

While some epoxy adhesives are cured using high pressures, for example pressures greater than 200 psi, the subject material may be cured at pressures of 200 psi or less, for example about 55 psi. Extreme pressures are avoided where possible during printhead manufacture, as various printhead structures such as piezoelectric elements and electrical circuits may be damaged during high pressure assembly processes. Still, high pressures are used in conventional processes with some conventional adhesives to improve adhesive bonding and printhead reliability.

After forming a laminated printhead structure such as the structure of FIG. 1 using a TF0063-86 adhesive, the printhead is filled with an ink 206 (FIG. 2), for example UV or UV gel ink, solid inks, or aqueous inks. These inks are particularly chemically reactive with conventional epoxy adhesives applied using conventional techniques, which are exposed to the ink within the printhead. In an embodiment, the subject materials resists chemical interaction with the ink, for example weight gain and swelling (mass uptake).

Additionally, in an embodiment, a storage modulus of the epoxy adhesive is between about 100 megapascals (MPa) and about 1500 MPa at a temperature of 20° C. and between about 3 MPa and about 700 MPa at a temperature of 120° C. An embodiment of the adhesive may further have a shelf life of greater than one month at 20° C. and greater than one year at 0° C.

To reduce ink leakage between adjacent layers, a particle size of a filler material within an adhesive should be as small as possible. Fillers within the subject material may include a plurality of particles, wherein a maximum diameter (or a maximum dimension in any direction) of each of the plurality of particles is 1.0 µm or less. Filler materials may include one or more of calcium carbonate, silica, alumina, alumina trihydrate, barium sulfate, titania, and kaolin clay.

Figure 2:
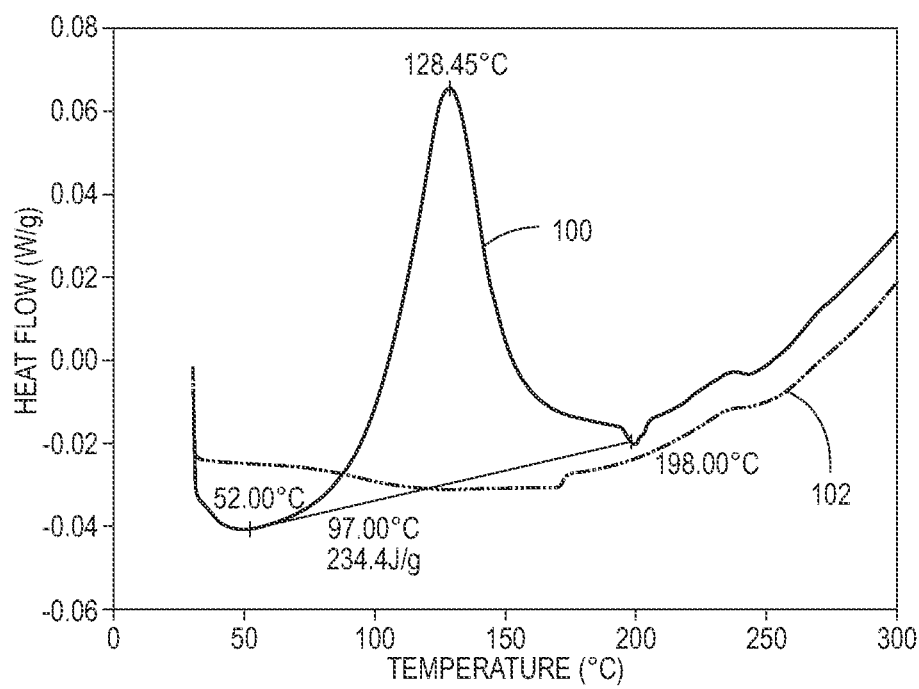
FIG. 2 is a differential scanning calorimetry (DSC) graph of a sample of the adhesive film prepared, dispensed, and cured according to an embodiment of the present teachings.

FIG. 2 is a differential scanning calorimetry (DSC) graph of a sample of the adhesive film prepared, dispensed, and cured according to an embodiment of the present teachings. FIG. 2 depicts the film before 100 and after 102 curing.

Figure 3:
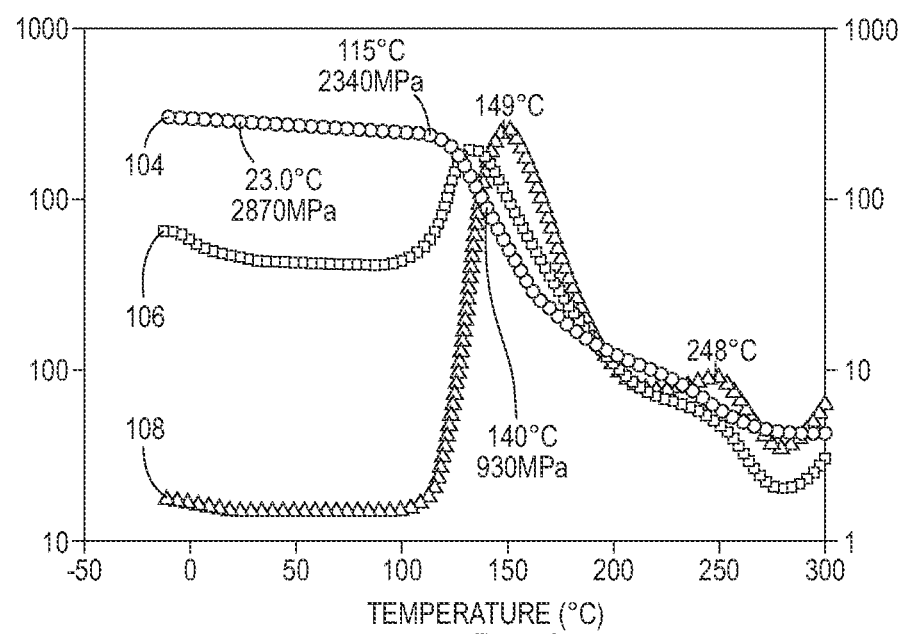
FIG. 3 is a dynamic mechanical analysis (DMA) graph of a sample of the adhesive film prepared, dispensed, and cured according to an embodiment of the present teachings.

FIG. 3 is a dynamic mechanical analysis (DMA) graph of a sample of the adhesive film prepared, dispensed, and cured according to an embodiment of the present teachings. For this sample, the adhesive film was cured at a temperature of 190° C. for 70 minutes. FIG. 3 shows the storage modulus (MPa) 104, loss modulus (MPa) 106, and the tan delta 108 for the cured film sample. FIG. 3 demonstrates that curing the sample at 190° C. for 70 minutes fully cures the adhesive. As shown in FIG. 3, the glass transition temperature (Tg) of the cured epoxy is about 149° C., which is well beyond the printhead operating temperature of 40° C. for aqueous inkjet.

Figure 4:
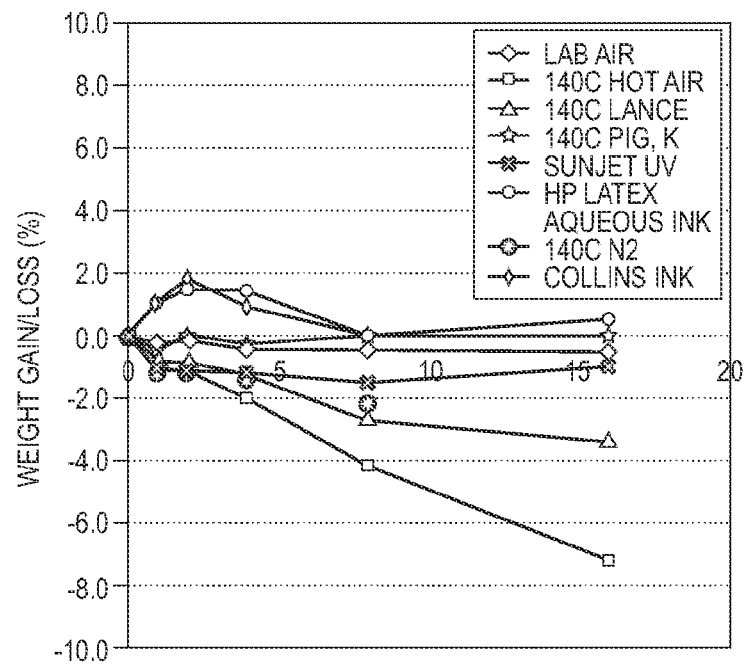
FIG. 4 depicts results of a test in which samples cured at 190° C. for 70 minutes were stored in a number of different conditions and inks.

FIG. 4 depicts results of a test in which samples cured at 190° C. for 70 minutes were stored in a number of different conditions and inks. Separate samples were stored in ambient lab air, air at 140° C., nitrogen at 140° C., and soaked in inks including Xerox LancE ink at 140° C., pigmented black ink at 140° C., SunJet UV ink, latex aqueous ink available from Hewlett Packard of Palo Alto, Calif., and dye-based aqueous ink available from Collins Inkjet of Cincinnati, Ohio for up to 16 weeks. The B-stage film adhesive demonstrated excellent ink compatibility. The film demonstrated less than 2% weight gain in both the latex aqueous ink and the dye-based aqueous ink.

Figure 5:
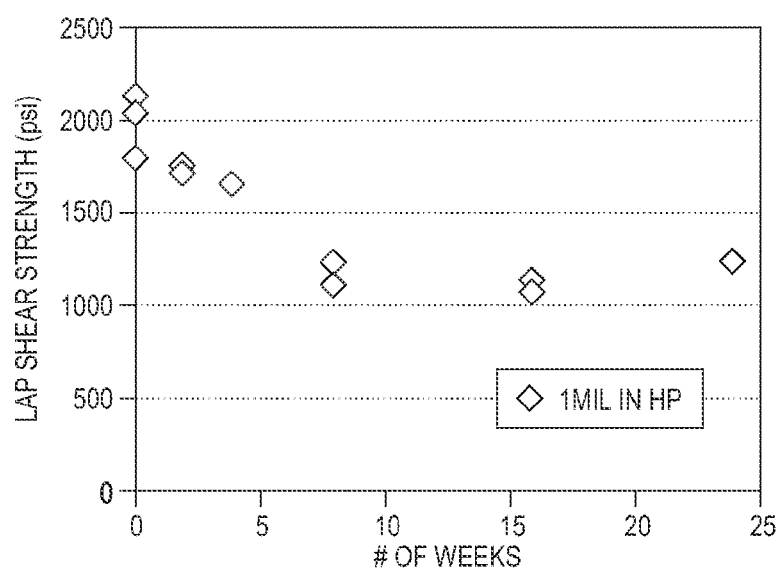
FIGS. 5 and 6 depict results of long-term bonding strength tests of a printhead manufactured using an embodiment of the present teachings when exposed to a number of different inks.
Figure 6:
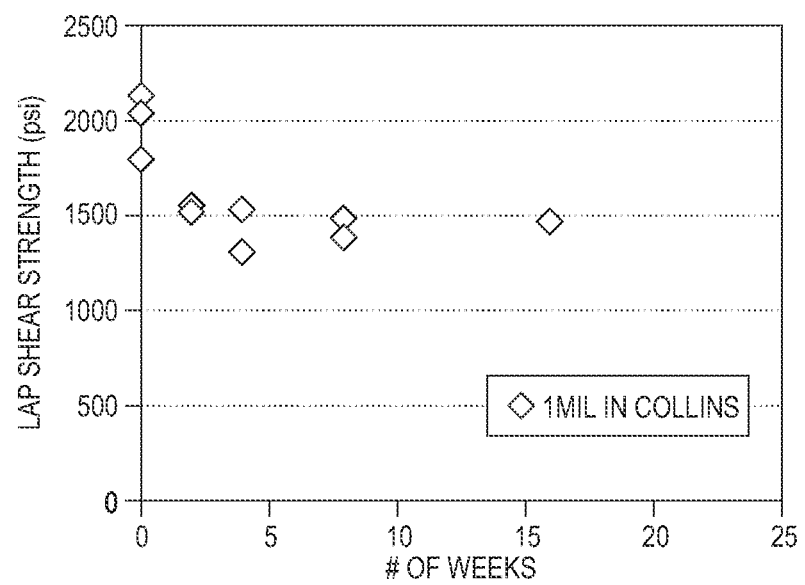

FIG. 5 depicts results of long-term bonding strength tests of a printhead manufactured using an embodiment of the present teachings. Lap shear coupons with 1 mil thickness of adhesive were prepared to evaluate the bonding strength of the adhesives using stainless steel adherends. Long term aging tests were initiated in aqueous ink environments. In a typical lap shear sample preparation, the stainless steel adherends were cleaned for 5 minutes in an ultrasonic bath of IPA followed by 4 minutes of detergent ultrasonic cleaning and 5 minutes of a DI water rinse. The parts were oven-dried for 30 minutes at 100° C. and then plasma cleaned. Subsequently, the adhesive was bonded between the two stainless steel adherends using the same tacking and bonding procedure as described above. FIGS. 5 and 6 show the lap shear aging results in aqueous ink environments. Data were collected at elevated temperature of 115° C. In HP latex aqueous ink (FIG. 5), shear strength decreases for a period of up to eight weeks and maintains a bonding strength of about 1200 psi for up to 24 weeks. In Collins dye-based aqueous ink (FIG. 6), shear strength decreases for a period of up to 5 weeks and maintains a bonding strength of about 1500 psi for up to 16 weeks. As demonstrated, in each case, an adhesive film prepared according to an embodiment described herein maintains a bonding strength well over 200 psi necessary for performance in aqueous ink printheads, and over 1000 psi.

Figure 7:
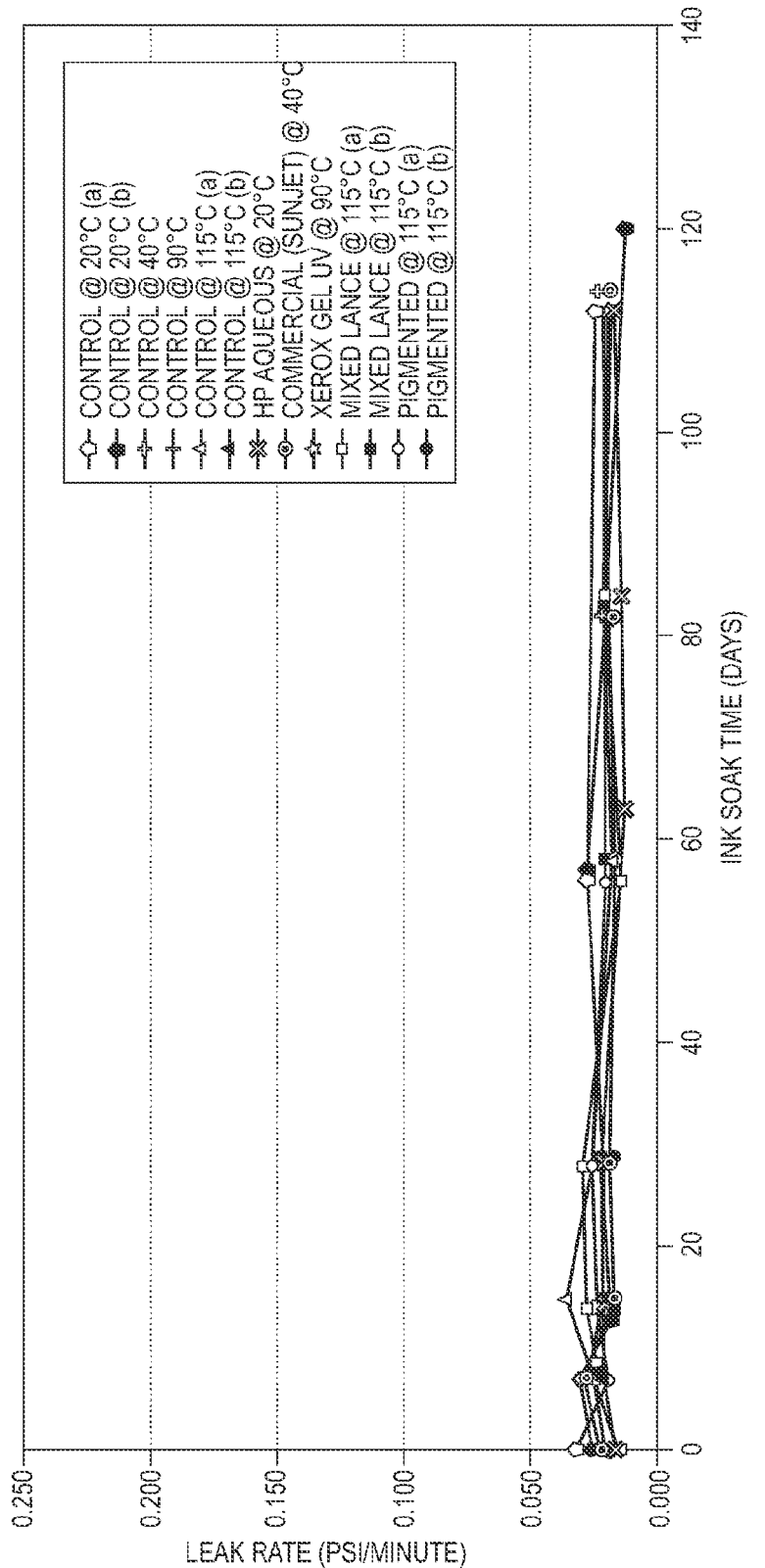
FIGS. 7 and 8 depict results of burst tests of a printhead test fixture manufactured using an embodiment of the present teachings when exposed to a number of different inks.

Additionally, burst tests were performed in a number of different inks using materials burst test structure (MTS) testing as a functional test to monitor leaks in the bonding interfaces using an adhesive according to an embodiment of the present teachings. Both coarse features and fine features were prepared and soaked into several aging environments, including HP latex aqueous ink. Both coarse features (FIG. 7) and fine features (FIG. 8) displayed no failures in any of the aging environments over more than 110 days of testing. While leakage is specified at a leak rate of 4.8 psi/min, the leak rates of the test samples all displayed a leak rate of less than 0.05 psi/min.

Figure 8:
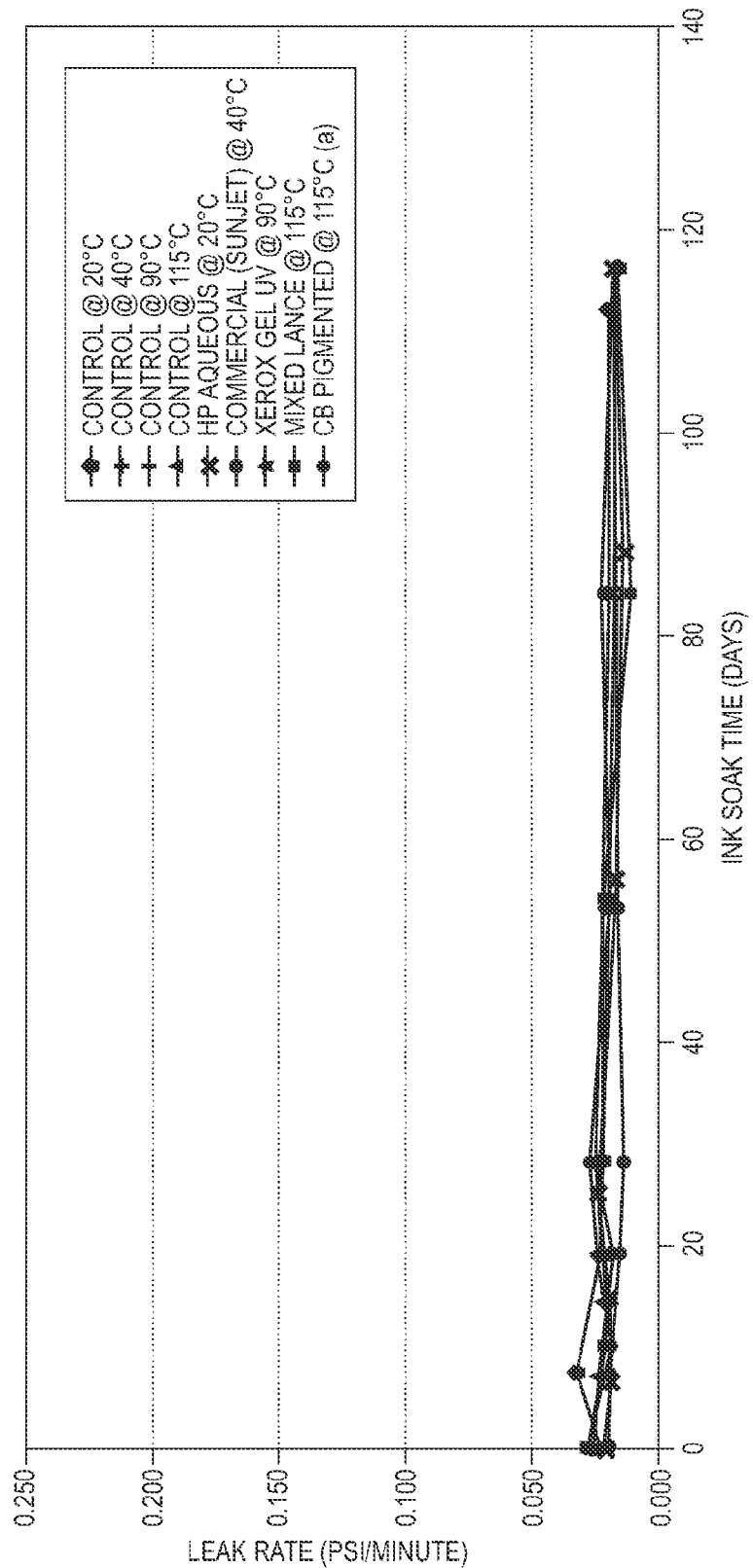
Figure 9:
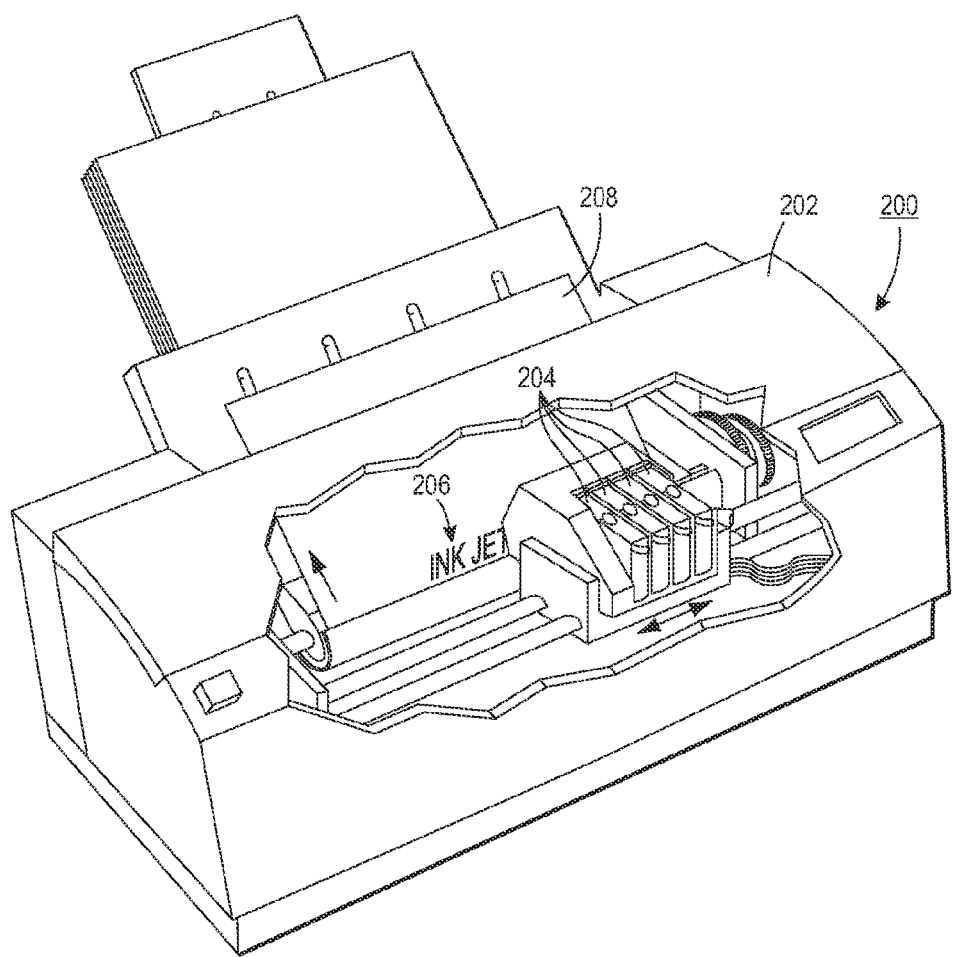
FIG. 9 is a perspective view of a printer including one or more printheads in accordance with an embodiment of the present teachings.

FIG. 8 depicts a printer 200 including a printer housing 202 into which at least one printhead 204 including an embodiment of the present teachings has been installed and that encases the printhead 204. During operation, ink 206 is ejected from one or more printheads 204. The printhead 204 is operated in accordance with digital instructions to create a desired image on a print medium 208 such as a paper sheet, plastic, etc. The printhead 204 may move back and forth relative to the print medium 208 in a scanning motion to generate the printed image swath by swath. Alternately, the printhead 204 may be held fixed and the print medium 208 moved relative to it, creating an image as wide as the printhead 204 in a single pass. The printhead 204 can be narrower than, or as wide as, the print medium 208. In another embodiment, the printhead 204 can print to an intermediate surface such as a rotating drum or belt (not depicted for simplicity) for subsequent transfer to a print medium.

Thus an adhesive prepared according to an embodiment of the present teachings demonstrates good compatibility and performance with a wide variety of inks which are generally recognized as providing a harsh and difficult ink environments for conventional printhead adhesives prepared and cured using conventional methods.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations, and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming an ink jet printhead, comprising:
heating a first surface of a first substrate to a temperature of between 40° C. and 120° C.;
contacting the heated first surface of the first substrate with a first surface of an epoxy adhesive to tack the epoxy adhesive to the first surface of the first substrate;
moving a roller across either a release liner on a second surface of the epoxy adhesive or a second surface of the first substrate to remove air bubbles at an interface between the first surface of the epoxy adhesive and the first surface of the first substrate;
cooling the first substrate and the epoxy adhesive to a temperature of 22° C. or less; then
heating a first surface of a second substrate to a temperature of between 40° C. and 120° C.;
with the epoxy adhesive tacked to the first surface of the first substrate, contacting the heated first surface of the second substrate with the second surface of the epoxy adhesive to tack the epoxy adhesive to the first surface of the second substrate;
moving a roller across a second surface of the second substrate to remove air bubbles at an interface between the second surface of the epoxy adhesive and the first surface of the second substrate; then
after tacking the epoxy adhesive to the first substrate and the second substrate, partially curing the epoxy adhesive by heating the first substrate, the second substrate, and the epoxy adhesive to a temperature of between about 80° C. and about 140° C. for a duration of between about 10 minutes and about 20 minutes;
after partially curing the epoxy adhesive, fully curing the epoxy adhesive by heating the first substrate, the second substrate, and the epoxy adhesive within a press to a temperature of between 100° C. and 300° C. for a duration of between 20 minutes and 200 minutes and at a pressure of between 40 psi and 100 psi;
filling the ink jet printhead with an aqueous ink and exposing the fully cured epoxy adhesive to the aqueous ink.

2. The method of claim 1, further comprising:
the heating of the first substrate heats the first substrate to a temperature of between 50° C. and 60° C.;
the heating of the second substrate heats the second substrate to a temperature of between 50° C. and 60° C.;
the partially curing of the epoxy adhesive heats the epoxy adhesive to a temperature of about 120° C.; and
the fully curing of the epoxy adhesive heats the epoxy adhesive to a temperature of about 190° C. at a pressure of about 55 psi.

3. The method of claim 1, further comprising:
the moving of the roller across either the release liner on the second surface of the epoxy adhesive or the second surface of the first substrate is performed at a roller pressure of between 1 psi and 10 psi; and
the moving of the roller across the second surface of the second substrate is performed at a roller pressure of between 1 psi and 10 psi.

4. The method of claim 1, further comprising:
cleaning the first surface of the first substrate and the first surface of the second substrate in a solvent; and
after cleaning the first surface of the first substrate and the first surface of the second substrate in the solvent, exposing the first surface of the first substrate and the first surface of the second substrate to a plasma to further clean the first surface of the first substrate and the first surface of the second substrate.

5. The method of claim 1, wherein the first substrate is one of a polymer and a metal, and the second substrate is the other of a polymer and a metal.

* * * * *